United States Patent
Yu et al.

(10) Patent No.: US 10,306,592 B2
(45) Date of Patent: May 28, 2019

(54) BROADCAST CHANNEL MANAGEMENT

(71) Applicant: Nokia Solutions and Networks Oy, Espoo (FI)

(72) Inventors: Ling Yu, Kauniainen (FI); Vinh Van Phan, Oulu (FI); Kari Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 17 days.

(21) Appl. No.: 15/031,714

(22) PCT Filed: Oct. 31, 2013

(86) PCT No.: PCT/EP2013/072763
§ 371 (c)(1),
(2) Date: Apr. 22, 2016

(87) PCT Pub. No.: WO2015/062653
PCT Pub. Date: May 7, 2015

(65) Prior Publication Data
US 2016/0270030 A1    Sep. 15, 2016

(51) Int. Cl.
*H04W 72/00* (2009.01)
*H04W 8/00* (2009.01)
(Continued)

(52) U.S. Cl.
CPC ......... *H04W 72/005* (2013.01); *H04W 8/005* (2013.01); *H04W 72/04* (2013.01); *H04W 76/14* (2018.02); *H04W 92/18* (2013.01)

(58) Field of Classification Search
None
See application file for complete search history.

(56) References Cited

U.S. PATENT DOCUMENTS

2007/0225044 A1* 9/2007 Law .............. H04W 74/002
                                                   455/562.1
2010/0020770 A1   1/2010 Qin et al.
(Continued)

FOREIGN PATENT DOCUMENTS

CN    1719931 A    1/2006
EP    1615388 A1   1/2006
(Continued)

OTHER PUBLICATIONS

International Search Report and Written Opinion received for corresponding Patent Cooperation Treaty Application No. PCT/EP2013/072763, dated Jul. 11, 2014, 12 pages.
(Continued)

*Primary Examiner* — Candal Elpenord
(74) *Attorney, Agent, or Firm* — Brake Hughes Bellermann LLP

(57) ABSTRACT

An apparatus comprising at least one processor, and at least one memory for storing instructions to be executed by the processor, wherein the at least one memory and the instructions are configured to, with the at least one processor, cause the apparatus at least: to receive and process a data transmission related to a communication channel allocated to a device-to-device broadcast communication, to determine an occupation state related to the received data transmission, to prepare an occupation indication related to the determined occupation state, and to conduct a processing for transmitting the occupation indication.

18 Claims, 11 Drawing Sheets

(51) Int. Cl.
*H04W 72/04* (2009.01)
*H04W 76/02* (2009.01)
*H04W 76/14* (2018.01)
*H04W 92/18* (2009.01)

(56) References Cited

U.S. PATENT DOCUMENTS

| | | | | |
|---|---|---|---|---|
| 2014/0003262 A1* | 1/2014 | He | ......................... | H04W 28/08 370/252 |
| 2015/0045050 A1* | 2/2015 | Sartori | .................. | H04W 8/005 455/452.1 |
| 2015/0045078 A1* | 2/2015 | Lee | ..................... | H04W 76/021 455/509 |

FOREIGN PATENT DOCUMENTS

| | | | |
|---|---|---|---|
| WO | 2006124221 | A2 | 11/2006 |
| WO | 2010015971 | A1 | 2/2010 |
| WO | 2013154328 | A1 | 10/2013 |

OTHER PUBLICATIONS

First Office Action for CN Patent Application No. 201380080654.3, dated Jul. 27, 2018, 10 pages.
Office Action for European Application No. 13789516.5, dated on Feb. 14, 2019, 7 pages.
Second Office Action for Chinese Application No. 201380080654.3, dated on Feb. 11, 2019, 5 pages.

* cited by examiner

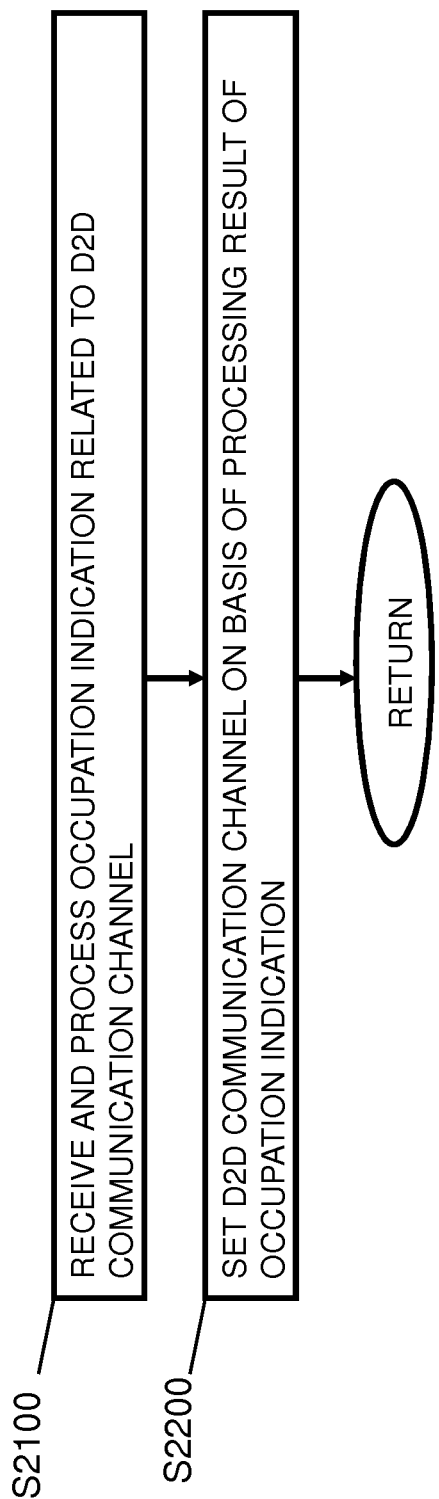

BROADCAST CHANNEL MANAGEMENT

RELATED APPLICATION

This application was originally filed as Patent Cooperation Treaty Application No. PCT/EP2013/072763 filed Oct. 31, 2013.

BACKGROUND

Field

The present invention relates to apparatuses, methods, systems, computer programs, computer program products and computer-readable media usable for conducting a broadcast channel management in a communication network.

Background Art

The following description of background art may include insights, discoveries, understandings or disclosures, or associations, together with disclosures not known to the relevant art prior, to at least some examples of embodiments of the present invention but provided by the invention. Some such contributions of the invention may be specifically pointed out below, whereas other such contributions of the invention will be apparent from their context.

So-called proximity based services (ProSe), which are also referred to as device-to-device (D2D) or machine-to-machine (M2M) communications are expected to become a feature in future communications networks. ProSe are designed to provide an option to offload (cellular) communications system, reduce battery consumption and increase bit-rate, and hence also enable new services.

D2D communications may be implemented, for example, as an underlay to cellular networks, such as an LTE-Advanced network. One intention of D2D communication in this case is to enable direct communication connection establishment between communication devices such as UEs under a continuous network management and control. D2D or ProSe may also be of relevance, for example, for communication requirements for public safety usage.

SUMMARY

According to an aspect of the present invention, there is provided an apparatus, comprising: at least one processor, and at least one memory for storing instructions to be executed by the processor, wherein the at least one memory and the instructions are configured to, with the at least one processor, cause the apparatus at least: to receive and process a data transmission related to a communication channel allocated to a device-to-device communication, to determine an occupation state related to the received data transmission, to prepare an occupation indication related to the determined occupation state, and to conduct a processing for transmitting the occupation indication.

According to another aspect of the present invention, there is provided a method, comprising: receiving and processing a data transmission related to a communication channel allocated to a device-to-device communication, determining an occupation state related to the received data transmission, preparing an occupation indication related to the determined occupation state, and conducting a processing for transmitting the occupation indication.

According to another aspect of the present invention, there is provided an apparatus, comprising: means for receiving and processing a data transmission related to a communication channel allocated to a device-to-device communication, means for determining an occupation state related to the received data transmission, means for preparing an occupation indication related to the determined occupation state, and means for conducting a processing for transmitting the occupation indication.

According to another aspect of the present invention, there is provided an apparatus, comprising: at least one processor, and at least one memory for storing instructions to be executed by the processor, wherein the at least one memory and the instructions are configured to, with the at least one processor, cause the apparatus at least: to receive and process an occupation indication indicating that a communication channel is occupied for a device-to-device communication, and to set a communication channel to be used for a device-to-device communication on the basis of the processing result of the occupation indication.

According to another aspect of the present invention, there is provided a method, comprising: receiving and processing an occupation indication indicating that a communication channel is occupied for a device-to-device communication, and setting a communication channel to be used for a device-to-device communication on the basis of the processing result of the occupation indication.

According to another aspect of the present invention, there is provided an apparatus, comprising: means for receiving and processing an occupation indication indicating that a communication channel is occupied for a device-to-device communication, and means for setting a communication channel to be used for a device-to-device communication on the basis of the processing result of the occupation indication.

According to further refinements, further aspects of the invention may comprise one or more of the following features:

- the occupation state may be determined by detecting that a device-to-device broadcast communication is conducted or intended to be conducted by a communication element on the communication channel to which the data transmission is related, wherein the occupation state may reflect that communication channel is occupied for a device-to-device communication;
- the occupation indication related to the determined occupation state may be prepared by generating a broadcast discovery sequence defined for the communication channel;
- resources to be used for communicating the broadcast discovery sequence may be different from resources to be used by a communication on the communication channel;
- the data transmission related to the communication channel allocated to the device-to-device communication may comprise a primary broadcast discovery sequence defined for each communication channel and used for a broadcast channel discovery processing, wherein the occupation indication may be a secondary broadcast discovery sequence defined for each communication channel and linked to the primary broadcast discovery sequence;
- resources to be used for communicating the primary broadcast discovery sequence and the secondary broadcast discovery sequence may not overlapping with each other;
- the processing for transmitting the occupation indication may comprise a decision of whether a transmission of the occupation indication is to be caused, wherein the decision may be based on at least one of a received power of the data transmission related to the communication channel allocated to the device-to-device broadcast communication, a received power of an occupation indication received from another communication network, and an external command indicating that the occupation indication is to be transmitted;

the occupation indication related to the determined occupation state may be prepared by generating a higher layer signaling comprising a channel occupation message;

the higher layer signaling may be part of a device-to-device discovery/beaconing message including an information element comprising the occupation indication;

the occupation state may be determined by collecting information regarding discovered broadcast channels on the basis of received data transmission related to communication channels allocated to a device-to-device broadcast communication, and detecting on the basis of the collected information that a device-to-device communication is conducted by a communication element on at least one of the communication channels to which each received data transmission is related, wherein the occupation state reflects that a communication channel is occupied for a device-to-device communication;

the processing for transmitting the occupation indication may comprise a decision of whether a transmission of the occupation indication is to be caused by higher layer signaling, wherein the decision may based on at least one of a number of occupied communication channels determined in the determination of the occupation state, a received power of a beacon signal received from another communication element, a number of occupied communication channels indicated in an occupation indication received from another communication element, and an external command indicating that the occupation indication is to be transmitted;

a device-to-device communication may comprise a device-to-device broadcast communication;

the processing for transmitting the occupation indication may comprise causing the transmission of the occupation indication;

the apparatus or method may be implemented in a communication element capable of participating in a device-to-device communication, wherein the communication element may be a terminal device or user equipment capable of communicating in a communication cell controlled by a communication network control element.

In addition, according to embodiments, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which:

FIG. 11 shows a flow chart of an example of processing conducted in a communication element acting as an occupation indication receiver in a channel management procedure.

DESCRIPTION OF EMBODIMENTS

Figure 1:
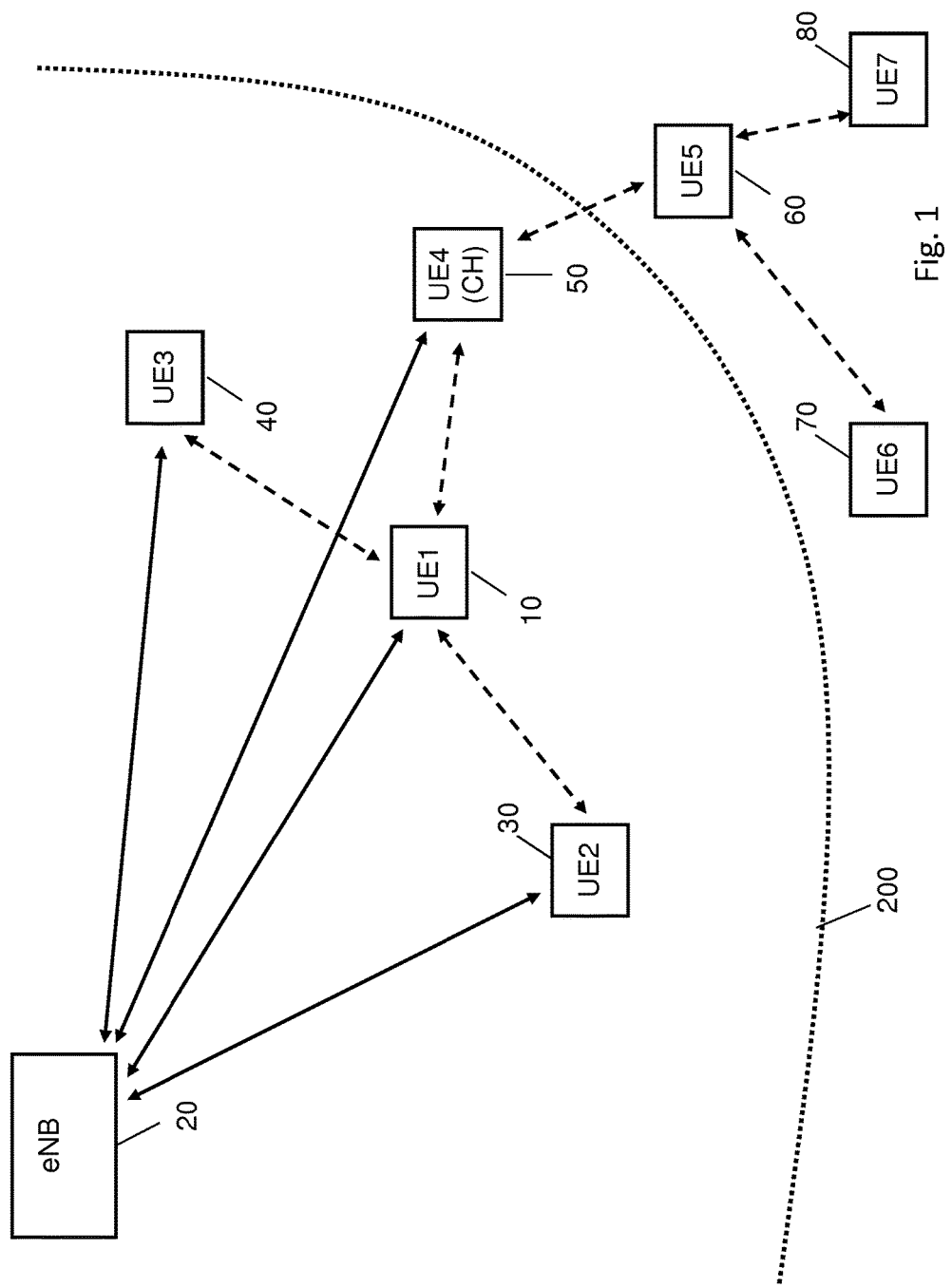
FIG. 1 shows a diagram illustrating an example of a communication network configuration.

The following meanings for the abbreviations used in this specification apply:

BS: base station
CPU: central processing unit
D2D: device-to-device
DL: downlink
E-UTRAN: evolved UMTS radio access network
eNB: evolved node B
LTE: Long Term Evolution
LTE-A: LTE Advanced
M2M: machine-to-machine
ProSe: proximity services
UE: user equipment
UL: uplink
UMTS: universal mobile telecommunication system Embodiments are applicable to any user device, such as a user terminal, as well as to any network element, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile adhoc networks (MANETs) and Internet Protocol multimedia subsystems (IMS).

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

A basic system architecture of a communication system where example versions and embodiments are applicable may comprise an architecture of one or more communication networks comprising a wired or wireless access network subsystem and a core network. Such an architecture may comprise one or more communication network control elements, access network elements, radio access network elements, access service network gateways or base transceiver stations, such as a base station or an eNB, which control a respective coverage area or cell and with which one or more communication elements or terminal devices such as a UE or another device having a similar function, such as a modem chipset, a chip, a module etc., which may also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that additional network elements and signaling links may be employed for a communication of a communication element and a base station besides those described in detail herein below.

The communication network is also able to communicate with other networks, such as a public switched telephone network or the Internet. The communication network may also be able to support the usage of cloud services. It should be appreciated that a base station and/or eNBs or their functionalities may be implemented by using any node, host, server or access node etc. entity suitable for such a usage.

Furthermore, the described network elements, such as terminal devices or user devices like UEs, communication network control elements, like a base station or an eNB, and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, may be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

With regard to FIG. 1, a diagram illustrating a general configuration of an example of a communication network, where some example versions and embodiments may be implemented is shown. It is to be noted that the configuration shown in FIG. 1 shows only those devices, network elements and/or parts which are useful for understanding principles underlying the example versions and embodiments. As also known by those skilled in the art there may be several other network elements or devices involved in a communication network which are omitted here for the sake of simplicity.

In FIG. 1, a communication network configuration is illustrated which is for example based on the 3GPP specifications. It is to be noted that there may be also parallel (neighboring) cells which are however omitted for the sake of clarity. It is to be noted that the general functions of the elements described in connection with FIG. 1 as well as of reference points/interfaces between the elements are known to those skilled in the art so that a detailed description thereof is omitted here for the sake of simplicity.

As shown in FIG. 1, in the exemplifying communication network system, a communication network control element such as, for example, a base station or eNB 20 controls a communication cell 200. In the communication cell 200, several communication elements or UEs are located, e.g. UE1 10, UE2 30, UE3 40, and UE4 50. Furthermore, further communication elements such as UE5 60, UE6 70 and UE7

80 are depicted which are assumed to be out of coverage of the cell 200. It is to be noted that the UEs indicated in FIG. 1 may be mobile terminals, servers, routers etc.

As indicated by solid arrows, the eNB 20 is configured to conduct a (wireless) communication with the UEs located in the coverage area of the cell 200. These communications concern, for example, an exchange of control information, user data etc. Furthermore, the eNB 20 is connected with a core network via suitable interfaces (not shown).

It should be appreciated that according to some examples, a so-called "liquid" or flexible radio concept is employed where the operations and functionalities of a communication network control element or of another entity of the communication network, such as of the eNB, may be performed in different entities, such as a node, host or server, in a flexible manner. In other words, a "division of labour" between involved network elements or entities may vary case by case.

According to some examples or embodiments, the communication network shown in FIG. 1 implements also mechanisms allowing to provide proximity based services (ProSe), i.e. to conduct D2D communications. For example, the communication elements indicated in FIG. 1 are configured to participate in a broadcast D2D communication either as a transmitter and/or as a receiver of broadcast communications.

It is to be noted that D2D communication may be implemented also outside of a network coverage, e.g. for public safety use cases. One intention of D2D communication in this case is to enable direct communication including broadcast communication between communication devices such as UEs when they are not in the network coverage.

Broadcast D2D communication are usable, for example, in public safety use cases where D2D broadcast communication may be extended to support group communication which may be used in public safety operation. Another option is to apply D2D communications in commercial use cases, such as advertising. D2D is considered to be used mainly in short range applications, such as providing local services. Therefore, it is possible to reuse resources used e.g. for broadcast channels at a different location wherein, however, interference is to be controlled.

In one control scheme for managing D2D communications, a cellular network may establish a new type of radio bearer dedicated for D2D communications and stay in control of session setup and radio resources without routing user plane traffic. In FIG. 1, corresponding connection paths are indicated by dashed arrows between the respective UEs, for example. In such network-controlled D2D communications, UEs may have both cellular bearers (at least some default signaling bearers for network control purposes) and D2D bearers configured, thus they may have a "mixed" configuration. The user devices may be configured to switch between communicating with a serving communication network control element, such as an eNB, in a regular cellular access mode (on a cellular radio bearer) and with each other in a D2D mode (on a D2D radio bearer) in a time-division or time-sharing fashion.

In the "mixed" configuration case described above, a network may utilize clusters in order to reduce signaling: a communication network control element, such as an eNB, may allocate resources for a cluster, and a cluster head or master device further allocates them to cluster members. In the example according to FIG. 1, UE4 50 is configured to act as a cluster head (CH) wherein UE5 60 is configured as a cluster member. It should be understood that acting as a cluster head may require node-like operation from a UE or server. Clusters may also be flexible and thus alter according to needs and/or time. User devices may enter and leave a cluster when they move from one coverage area to another, for example. Additionally, cluster heads may act as a relay for UEs being out of coverage, such as UE5 60. It is to be noted that a UE-to-Network relay is only one type of D2D communication for UEs out-of-coverage. As indicated in FIG. 1, the out-of-coverage UEs, such as UE5 60, UE6 70 and UE7 80, may also conduct D2D communications between them, e.g. in a public safety use case.

Moreover, it is to be noted that another option to manage the D2D communications is to use a de-centralized control scheme where, for example, a contention based control mechanism is employed. Here, for example, a UE communicating in a D2D mode may select one or more of (predetermined or preconfigured) channels allocated to D2D communications in a more independent manner, i.e. a self-configuration of the D2D communication on the user device is possible.

According to one example for a control of D2D communications, the network controls radio resources used for the D2D or ProSe communication. With regard to public safety requirements for D2D communications, which include functionality for broadcast and group communications, an authorised public safety UE in or out of the coverage of the network is able to send a broadcast message to all authorised public safety UEs within transmission range, regardless of group membership, using e.g. ProSe broadcast communications in a single transmission.

Broadcast communication in public safety applications may facilitate, for example, communications among users, such as a group of proximate devices. Specifically, one or more devices may be transmitting while other devices are receiving without requiring two-way communication or coordination.

However, management of ProSe broadcast communication is different from, for example, management of broadcast services in a cellular mode. In the latter, static broadcast channels transmitted by a network entity (e.g. base stations) are usually hardcoded in order to allow receiving UEs to detect the broadcasted channels and receive the broadcasted information. As in the cellular mode, the broadcasting network entity is usually deployed in a coordinated way with network planning and the broadcasted information is predefined and rather static, the static broadcast channels approach is appropriate.

However, when considering a ProSe or D2D broadcast communication scheme, as illustrated in FIG. 1, an approach using a static broadcast channel allocation may not be optimal in all cases. In such a scenario, such as in commercial or public safety application cases, the broadcast services may be time dependent and the broadcasted information may be quite dynamic.

According to some examples or embodiments, for supporting ProSe broadcast communication, multiple orthogonal broadcast channels (e.g. #1 to #N) may be defined in time and frequency domains based on synchronization provided by network (e.g. eNB 20 in case of in-network coverage) or some central entities (e.g. D2D cluster head UE4 50 in case of out-of-network-coverage). The allocation of each broadcast channel and corresponding configurations (including e.g. primary and secondary sequences, as described further below) may be advertised by the network, e.g. by means of a system information transmission etc., or pre-configured and known by the UEs being configured to participate in D2D communications.

When ProSe broadcasting communication is conducted, a broadcasting user device or UE (e.g. UE2 30) typically transmits user plane data information to all UEs within communication range (for example UE1 10). However, there may be situations where multiple UEs are broadcasting at the same time within a certain local area. In general, in order to avoid interference among the broadcasting services, such UEs should use different broadcast channels for their broadcast services.

However, the broadcasting entities (e.g. ProSe enabled UEs like UE2 30 and UE3 40) may not be static but moving. Therefore, in case of a ProSe broadcast communication, the coordination or management of the broadcast channels may become even more complicated.

For example, a so called "hidden-node" problem may be seen as one challenge in broadcast channel management in a dynamic environment with moving broadcasting devices. This means, for example, two (or more) broadcasting UEs which are not able to detect each other exist (for example, the distance is too far between the UEs or there are obstacles like buildings preventing that the signals from one of the broadcasting UEs is received by the other UE). In the example illustrated in FIG. 1, it is assumed that UE2 30 and UE3 40 are such broadcasting UEs which are hidden from each other. Assuming that the broadcasting UEs 30 and 40 select or are allocated to the same broadcast channel for D2D broadcast communication, a situation may occur, where a receiving UE, such as UE1 10 in FIG. 1, which is able to receive broadcast communications from both UEs 30 and 40, e.g. when it is located in middle of the two broadcasting UEs 30 and 40, may fail to receive either one of the UEs' broadcast information as they may interfere with each other at the receiving UE (since they use the same broadcast channel).

Another matter is that depending on the actual type of application of broadcast services, different preferences may exist regarding to the processing goal when broadcast channels are discovered by a receiving UE. For example, in case of open information sources, such as in commercial applications like advertising, the discovery of the actual source (i.e. who has sent the broadcast communication) might not be so important; here, it is more relevant to recognize which service is meant and which broadcast channel is used. On the other hand, in applications concerning more authenticated and authorized broadcast services, such as public safety applications, it is typically important to recognize the source, i.e. it is a goal to discover the correct or closed broadcasting sources and services thereof.

According to some examples or embodiments, a broadcast channel management mechanism is provided which is applicable in a communication network, for example, in a ProSe or D2D broadcast communication scenario. For example, according to some examples or embodiments, an occupation indication is provided by a receiving UE so as to assist the broadcast channel management on the transmitter side. That is, according to some examples or embodiments, a broadcast channel occupation indication is provided and processed so as to facilitate a selection or allocation of a ProSe broadcast channel for ProSe broadcasting UEs even in a "hidden node" situation.

Figure 2:
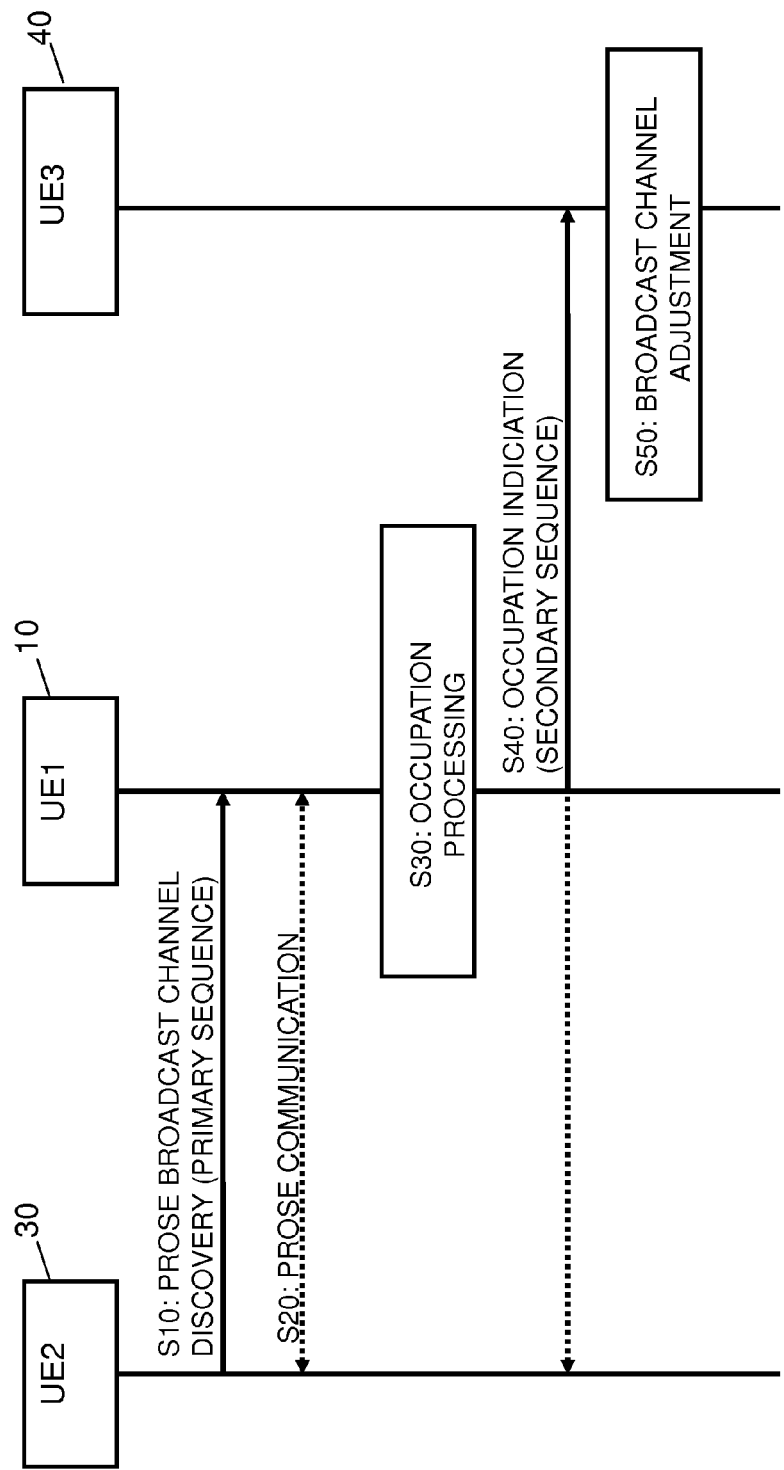
FIG. 2 shows a signaling diagram illustrating an example of a broadcast channel management procedure.

FIG. 2 shows a signaling diagram illustrating a broadcast channel management procedure according to some examples or embodiments, which is based on the network structure shown in FIG. 1. More specifically, in FIG. 2, a broadcast channel management procedure is illustrated, wherein a mechanism using e.g. a physical sequence is implemented. That is, according to these examples or embodiments, a broadcast channel occupation indication is announced in the form of a physical sequence by a UE which is able to discover the broadcast channel used. According to further examples or embodiments, also mechanisms used to select a UE as an occupation indication provider are provided.

According to the embodiments being based on the mechanism illustrated in FIG. 2, two broadcast discovery sequences, i.e. a primary broadcast discovery sequence and a secondary broadcast discovery sequence, are defined for each broadcast channel allocated to D2D broadcast communication. According to some embodiments, for each channel, the secondary sequence may be linked to the corresponding primary sequence, e.g. by using some permutations or by including another indication to which primary sequence the secondary sequence is linked. Thus, it is possible to facilitate the mapping and detection of the correct secondary sequence.

Additionally, according to some embodiments, the configuration of the elements involved in the D2D broadcast communication, such as the UEs or the eNB, is made in such a manner that communication resources used for transmitting primary and secondary sequences are not overlapping with each other. That is, a UE transmission of an occupation indication in the form of the secondary sequence, (which may be determined on the basis of the detection of the primary sequence) does not come into conflict with the communication of the primary sequence.

According to some embodiments, a UE which provides ProSe or D2D broadcast services, transmits a primary sequence to allow other UEs to discover the broadcast channel. That is, broadcast channel discovery is based on the detection of the primary broadcast discovery sequence which is communicated or signaled so as to indicate the broadcast channel. According to some embodiments, the primary discovery sequence may be the same as a general discovery sequence but reserved and allocated for individual broadcast channel and/or service of interest.

Referring to FIG. 2, a plurality of UEs (here, the two UEs 30 and 40) which provide ProSe or D2D broadcast services are shown. In the example of FIG. 2, in S10, the UE2 30 conducts a data transmission (such as a beacon signaling, a broadcast signaling, a directed signaling, etc.) related to a broadcast communication using a broadcast channel for D2D broadcast services. According to some embodiments, the data transmission comprises the primary discovery sequence allocated to the channel. This data transmission is received by UE1 10, for example, and processed. As a result, it may be assumed that in S20, a ProSe broadcast communication is established between UE2 30 as the broadcast service provider and UE1 10 as the broadcast service receiver. Thus, the broadcast channel indicated by the primary sequence in S10 is occupied by a (broadcast) communication.

It is to be noted that according to some embodiments, the establishment of the broadcast communication is not required for an occupation state determination. That is, even if a broadcast communication is not established in S20, the broadcast channel indicated by the primary sequence in S10 may be assumed to be occupied. On the other hand, according to other embodiments, an occupation of the channel is only assumed after the establishment of the broadcast communication (i.e. UE1 10 receives data via the broadcast channel).

In S30, the receiving UE (i.e. UE1 10) conducts a processing which is referred to also as occupation processing. One purpose of the occupation processing is to determine that a broadcast channel (and also which broadcast channel) to which the received data transmission of S10 is related is occupied by a communication.

It is to be noted that according to some embodiments, the occupation processing in S30 is to be conducted each time a data transmission related to a D2D broadcast communication (e.g. a broadcast channel discovery signal) is received, i.e. in connection with S10 but also any other data transmission related to a broadcast communication from another source (e.g. UE3 40). For example, it may be that two or more UEs choose the same broadcast channel at almost simultaneously. For example, a UE (e.g. UE3 40) sends a data transmission related to a broadcast channel used for its D2D broadcast services wherein the channel is the same as the one used by another UE (e.g. UE2 30). Hence, the data transmission comprises the same primary discovery sequence as in S10. Also this data transmission is received by UE1 10, for example, and processed. Also in this case, the UE1 10 determines that the channel is occupied and may correspondingly transmit (broadcast) an occupation indication.

The determination that a channel is occupied may be based, for example, on a detection of a primary sequence being received. Alternatively or additionally, also a check that a (broadcast) communication is conducted on the related channel may serve for determining the occupation state. Alternatively, also information derived from the received primary sequence may be compared with corresponding information of primary sequences being previously received and stored, for example, for determining the occupation state.

When it is determined that the channel is occupied, an occupation indication may be prepared indicating that this specific channel is used for broadcasting. In the present embodiments, as indicated above, the secondary sequence corresponding to the primary sequence received in S10 is read or derived and used as the occupation indication.

Then, in S40, the occupation indication (i.e. the secondary sequence) is caused to be transmitted. For example, the transmission is carried out by a suitable component of the UE1 10 in specific resources by means of broadcasting. In the example shown in FIG. 2, the occupation indication is received, for example, by the UE3 40, but also other communication elements such as other UEs may, of course, receive and process the occupation indication. In the case of e.g. a centralized control of the D2D communication, the detection of the occupation indication is carried out in the UE side. Then, the UE may send a report indicating detected/received occupation indications to a communication network control element, such as eNB, which allocates suitable broadcast channels to the reporting UE based on the information regarding occupied channels derivable from the report.

It is to be noted that, according to some embodiments, the occupation processing in S30 comprises also a processing related to the transmission of the occupation indication. For example, the occupation indication is sent only by one or more UEs selected from those UEs which are able to detect a primary discovery sequence. The selection may be carried out by an external command (e.g. from the eNB 20) or as a result of a self-configuration. In any case, the selected UE (here, UE1 10 is assumed to be selected) may transmit a secondary discovery sequence to announce occupation of the broadcast channel by another UE within the discovery range.

According to some embodiments, the selection (or self-configuration) of a UE may be based on at least one of the criteria explained by means of examples in the following. For example, as one criterion, a level of the received power of the data transmission with which the primary sequence is received, is measured and used for determining by the UE whether the occupation indication shall be transmitted. For example, the UE (e.g. UE1 10) which detects the primary sequence receives the data transmission from another UE (e.g. UE2 30) with a received power being lower than a predetermined threshold, is selected (or configures itself) to transmit a corresponding secondary sequence as occupation indication. Alternatively or additionally, the level of a received power of a data transmission comprising a secondary sequence (in case such a secondary sequence is detected in a data transmission from another UE) is used for determining whether the UE shall send the occupation indication. For example, in case the UE1 10 detects the corresponding secondary sequence being sent also by another UE (e.g. UE4 50), it is checked, whether the level of the received power of this secondary sequence is higher than a predetermined threshold. If the level of the received power is larger than the threshold, it is determined that the present UE (i.e. UE1 10) is not selected (or does not configure itself) to transmit the secondary sequence.

In this example, when a UE such as UE3 40 intends to start a ProSe/D2D broadcast service, the broadcast channel to be used is set in S50. The broadcast channel may be selected in such a manner that, on the basis of the UE measurement report received by means of the occupation indication in S40, a free broadcast channel on which neither a primary nor a secondary sequence was not detected/received, is set to be used for the D2D broadcast communication. It is to be noted that in case of a centralized control conducted by a communication network control element, a corresponding free broadcast channel may be allocated to the UE by a controlling element, such as the eNB 20.

That is, when the receiving UE such as UE1 10 sends (i.e. broadcasts) the occupation indication (here the secondary sequence), any UE intending to conduct a broadcasting communication, such as UE3 40, upon detecting the occupation indication transmitted by the UE1 10, will not choose a broadcast channel for its D2D broadcast services which is the same as that indicated in the occupation indication.

According to the embodiments using a physical sequence-based option for the broadcast channel management, as described in connection with FIG. 2, a fast detection of broadcast channels and services is possible which is suitable especially for open broadcasting sources and services.

In the above described embodiments using a physical sequence based option for the broadcast channel management, the primary sequence is transmitted by the UE providing a broadcast service, for example, by using predefined communication resources which are known by all UEs configured to participate in a broadcast communication, for example. On the other hand, the secondary sequence may be transmitted by a receiving UE (i.e. the selected or self-configured UE) which is able to detect the primary sequence. It is to be noted that it is not necessary for a primary sequence transmitting UE (such as UE2 30) to receive the corresponding secondary sequence. The other UE which intends to start a broadcast service (e.g. UE3 40) has, typically, to scan all possible primary and secondary sequences. On this basis, at least one free broadcast channel may be selected (or allocated), i.e. detected primary and secondary sequences are considered. In order to enable a UE to transmit the secondary sequence as an occupation indication based on a detected primary sequence, for example in case of a half-duplex operation mode, communication resources allocated for primary and corresponding secondary sequence transmission are set such that they do not overlap each other for example in time domain.

Additionally, in the above described embodiments using a physical sequence based option for the broadcast channel management, there may be a one-to-one mapping between secondary sequence and a broadcast communication channel. However, according to some embodiments, communication resources used for transmitting the secondary sequence and the broadcast channel are different from each other so that a transmission of the secondary sequence (as the occupation indication) does not cause interference to the broadcast channel itself.

Figure 3:
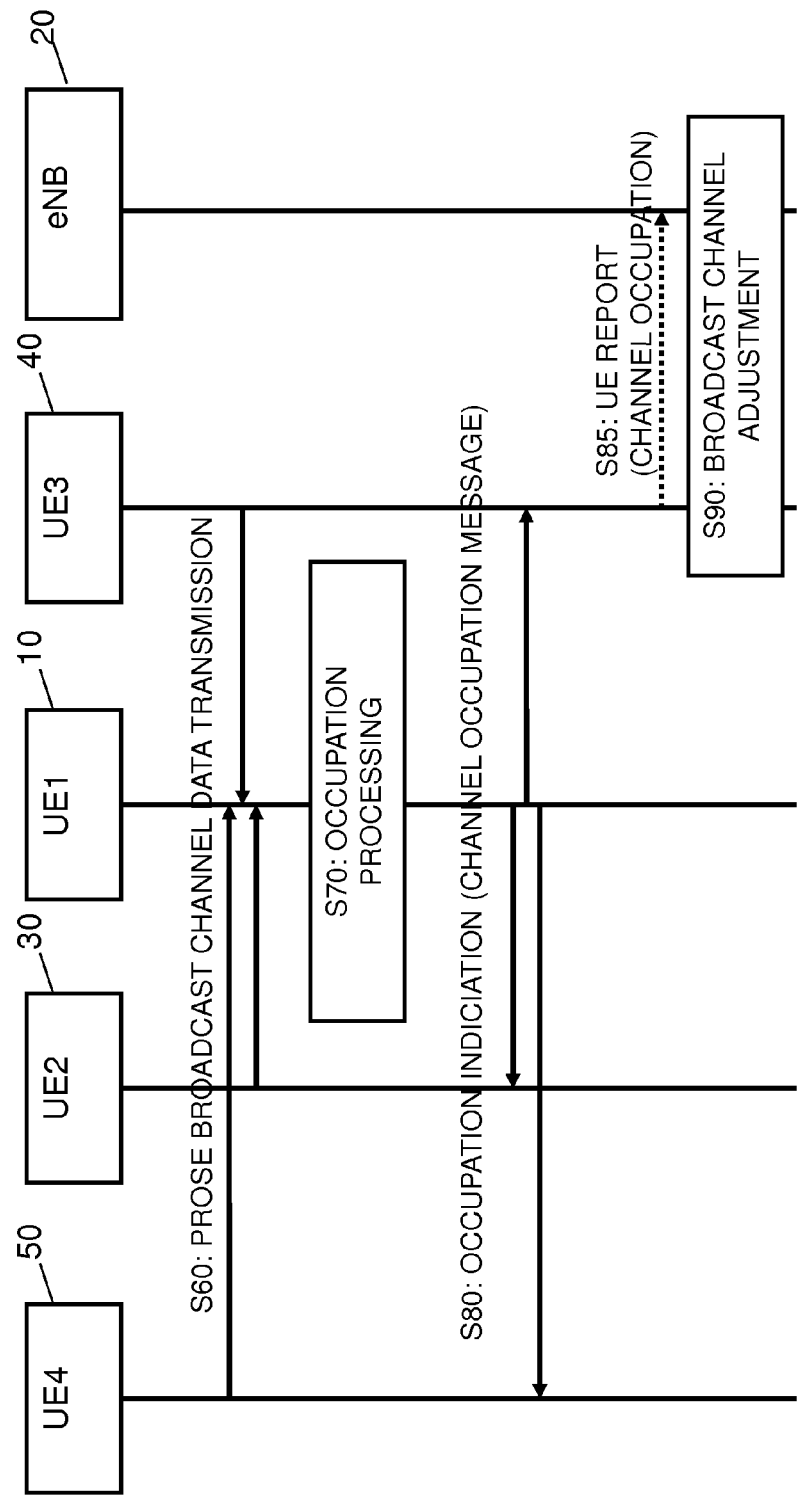
FIG. 3 shows a signaling diagram illustrating another example of a broadcast channel management procedure.

FIG. 3 shows a signaling diagram illustrating a further broadcast channel management procedure according to some embodiments. In FIG. 3, an example of a broadcast channel management procedure is illustrated where a mechanism using e.g. a channel occupation message is implemented. That is, according to these embodiments, a broadcast channel occupation indication is announced in the form of a higher layer signaling by a UE which is able to discover the broadcast channel used. According to some further embodiments, also mechanisms used to select a UE as an occupation indication provider are provided.

According to embodiments being based on the exemplifying mechanism illustrated in FIG. 3, receiving UE(s) are configured to collect broadcast channel occupation information on the basis of discovered broadcast channels and to prepare a corresponding occupation indication in the form of a channel occupation message. This message is then advertised to provide the information by using a pre-defined higher layer message. According to some embodiments, for example, a ProSe discovery/beaconing message may be used as the higher layer message wherein at least one additional optional information element for conveying the occupation indication is included. By means of the channel occupation message, it is possible to facilitate broadcast channel selection or allocation.

Referring to FIG. 3, a plurality of UEs (here, the three UEs 30, 40 and 50) which provide ProSe or D2D broadcast services exist. In S60, the UEs 30, 40 and 50 conduct a respective data transmission (such as a beacon signaling, a broadcast signaling, a directed signaling etc.) related to a broadcast communication using a broadcast channel for D2D broadcast services. According to some embodiments, the data transmission comprises a discovery signal allocated to the corresponding channel.

It is to be noted that the data transmission from the respective UE may be transmitted at different timings.

The data transmission from the UEs 30, 40 and 50 is received by UE1 10, for example, and processed. For example, e.g. in case of plurality of data transmissions, a time window may be defined so that the plurality of data transmissions may be considered in the processing.

In S70, the receiving UE (i.e. UE1 10) conducts a processing which is referred to as occupation processing. One purpose of the occupation processing is to detect which of the broadcast channels to which the received data transmissions of S60 are related to, are occupied by a D2D broadcast service.

The determination that a channel is occupied may comprise, for example, a check whether broadcast channel discovery signal is received. Alternatively, whether a communication is conducted on the related channel may be checked, for example, in order to determine whether a channel is already occupied.

If it is determined that at least one channel (and/or which particular channel) is occupied, an occupation indication may be prepared indicating that there is at least one broadcasting channel detected/discovered to be occupied. In the present embodiments, as indicated above, a channel occupation message is prepared for being transmitted by a higher level signaling, such as a discovery/beaconing message is used for delivering the occupation indication.

Then, in S80, the occupation indication (i.e. the higher level signaling) is transmitted. For example, the transmission is carried out by means of broadcasting. In the example shown in FIG. 3, the occupation indication is received, for example, by the broadcasting UEs 30, 40 and 50.

It is to be noted that, according to some embodiments, the occupation processing in S70 comprises also a processing related to the transmission of the occupation indication. For example, the occupation indication is sent only by one or more selected UEs from those which are able to detect the primary discovery sequence. The selection may be done by an external command (e.g. from the eNB 20) or as a result of a self configuration. The selected UE (here, UE1 10 is assumed to be selected) transmits the channel occupation message to announce occupation of one or more broadcast channels by another UE within the discovery range.

According to some embodiments, the selection (or self-configuration) of the UE is based on at least one of the criteria explained as examples in the following. For example, the selection may be based on the number of the detected occupied broadcast channels. Another alternative or additional criterion may be, for example, the level of the received power of a beacon signal from any of those UEs which are able to detect similar broadcast channels. For example, a UE which detects the highest number of broadcast channels within a certain area is selected to advertise the broadcast channel occupation information. In this connection, closeness of the UEs may be based on a detected strength of a beacon signal from the respective UE (UEs having a beacon signal strengths higher than a certain threshold are deemed to be close enough for being considered in the processing). Another criterion may be a determination of a number of occupied broadcast channels indicated in another channel occupation message being transmitted from one of the other UEs (and being received by the present UE). For example, according to this criterion, a UE which currently transmits a channel occupation message and has received another channel occupation message including more occupied broadcast channels from other UEs may stop transmitting of the occupation indication. In this context, according to some embodiments, also a comparison of the contents is conducted for determining a value representing a number of occupied broadcast channels, i.e. the contents of the received occupation indication and the own prepared occupation indication may be compared.

In this example, before a UE starts a ProSe/D2D broadcast service, the broadcast channel to be used may be set or allocated in S90. In the example depicted in FIG. 3, before the setting or allocation of the broadcast channel, a report is transmitted in S85 from e.g. UE3 40 towards the eNB 20 as the control entity in a centralized control scheme. That is, the broadcast channel adjustment is conducted between a UE (here UE3 40) and the communication network control element (eNB20) controlling the channel setting. In other words, as described above, the detection of the occupation indication may be carried out in the UE side (here UE3 40), wherein the UE sends a report indicating detected/received occupation indications to the communication network control element eNB 20. The eNB 20 allocates in S90 suitable broadcast channels to the reporting UE (i.e. avoiding those being indicated to be occupied) based on the information regarding occupied channels derivable from the report from the UE.

However, according to some other embodiments being based on the example according to FIG. 3, also a decentralized approach is possible, wherein a UE itself conducts the broadcast channel adjustment in S90 (i.e. S85 is omitted). In any case, in the processing of S90, a broadcast channel is set in such a manner that on the basis of the information provided in the channel occupation message received by means of the occupation indication in S80, a free broadcast channel is set to be used for the D2D broadcast communication.

According to the embodiments using a channel occupation message based option for the broadcast channel management, as described in connection with FIG. 3, flexibility and adaptability may be improved. This is especially suitable for cases in which there closed, more authenticated and authorized broadcasting sources and services are provided.

Additionally, in the embodiments using a channel occupation message based option for the broadcast channel management, the channel occupation message may be implemented in D2D discovery/beaconing message. To support D2D discovery and communication, D2D discovery/beaconing information in some format, such as a message is needed to facilitate discovery among UEs in proximity, in which each UE has dedicated resources for discovery/beaconing information transmission. According to some embodiments, e.g. in centralized network controlled or distributed UE contention based approaches, each UE may be allowed to send a discovery/beaconing message without interference from other UEs. Therefore, a transmission of the channel occupation message in a D2D discovery/beaconing message is not usually prevented by the occupation of a ProSe broadcast communication channel.

As described above, according to some embodiments, the broadcast channel management procedure may be applied to a centralized broadcast channel allocation mechanism or a distributed contention based broadcast channel selection mechanism. For centralized broadcast channel allocation mechanism, the central entity, such as the eNB 20, may be configured to allocate the broadcast channel to broadcasting UEs based on UE's report of the detected occupation indication. The report may be received from the broadcasting UEs to which the communication network control element allocates the broadcast channel by means of a suitable signaling, or received from the UEs providing the occupation indication.

According to some further embodiments, in the centralized or network-assisted operation, the central entity or serving eNB 20 may provide an indication about D2D broadcast channel occupancy information within the cell coverage.

It is to be noted that the physical sequence based option may facilitate a UE detection processing, since only physical layer is involved to detect the occupation information. However, this option may indicate only the occupation of a broadcast channel or the availability of broadcast service, while a source of the broadcast service is not indicated by the sequence only. On the other hand, for example in a case of high density of broadcasting UEs, the higher layer signaling of the channel occupation message based option may be advantageous because otherwise multiple sequences may be transmitted by advertising UE and needs to be detected by the detecting UE. Additionally, the channel occupation information in higher layer message may be also used by the receiving UE to discover the broadcast channels and sources of the broadcast services when source information is also indicated in the higher layer signaling.

Figure 10:
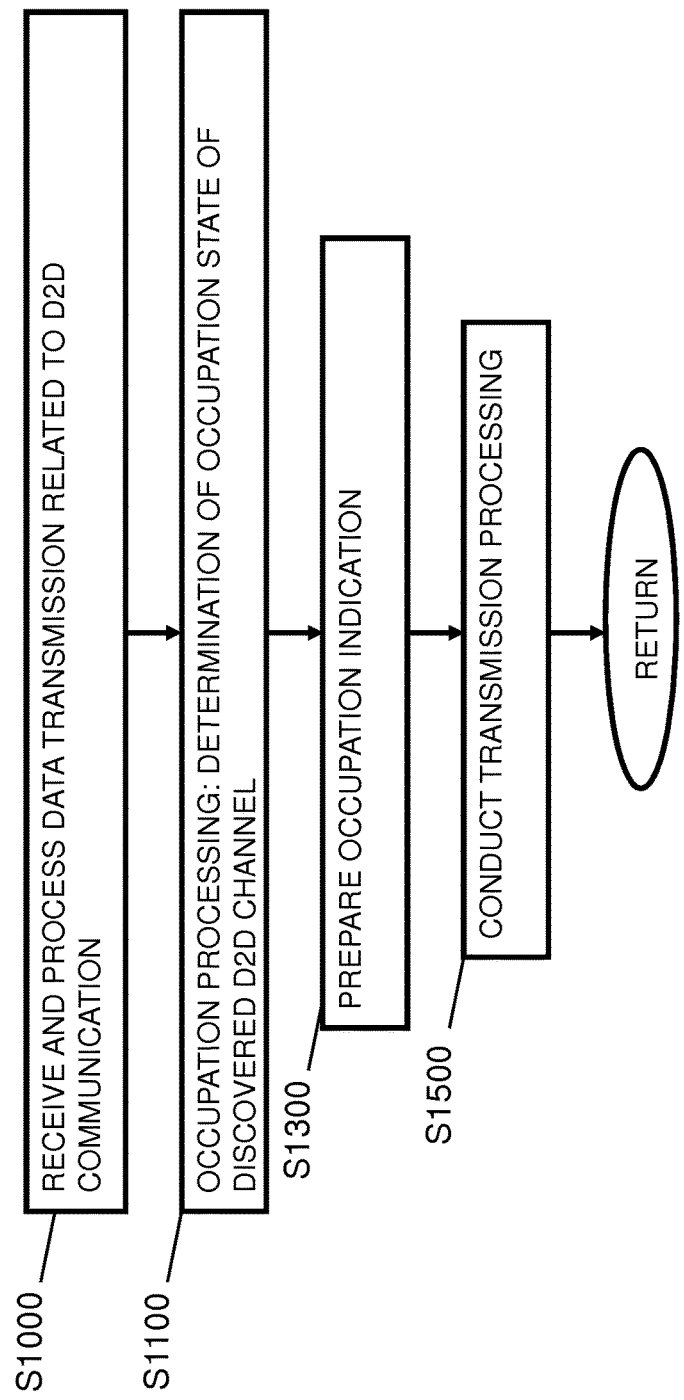
FIG. 10 shows a flow chart of an example of processing conducted in a communication element acting as an occupation indication provider in a channel management procedure.

FIG. 10 shows a flow chart of an exemplifying processing conducted in a communication element acting as an occupation indication provider (such as UE1 10 in FIG. 1) in a channel management procedure according to some embodiments.

In S1000, a data transmission related to a communication channel allocated to a D2D communication is received (i.e. obtained) and processed. For example, the data transmission may be a broadcast or beacon signaling related to a channel discovery, a D2D communication including a discovery message or sequence, or the like.

Then, in this example, an occupation processing is started. In S1100, an occupation state is determined which is related to the received data transmission. For example, the occupation state may be determined by detecting that a D2D communication is conducted or intended to be conducted by a communication element, such as an UE (e.g. UE2 30 uses the channel or it sends a discovery signal indicating that it intends to start a communication). That is, the occupation state may reflect that a communication channel is assumed to be occupied for a D2D communication by any UE.

In this example, in S1300, an occupation indication related to the determined occupation state is prepared.

According to some examples, the occupation indication related to the determined occupation state is prepared by generating a discovery sequence defined for the communication channel. According to some other examples, the occupation indication, the occupation indication is prepared by generating a higher layer signaling comprising a channel occupation message.

In this example, when the occupation indication is prepared, in S1400, a processing for transmitting the occupation indication is started. For example, it is determined whether the occupation indication prepared in S1300 is to be transmitted or not. Alternatively or additionally, the occupation indication is caused to be transmitted in S1300.

Figure 4:
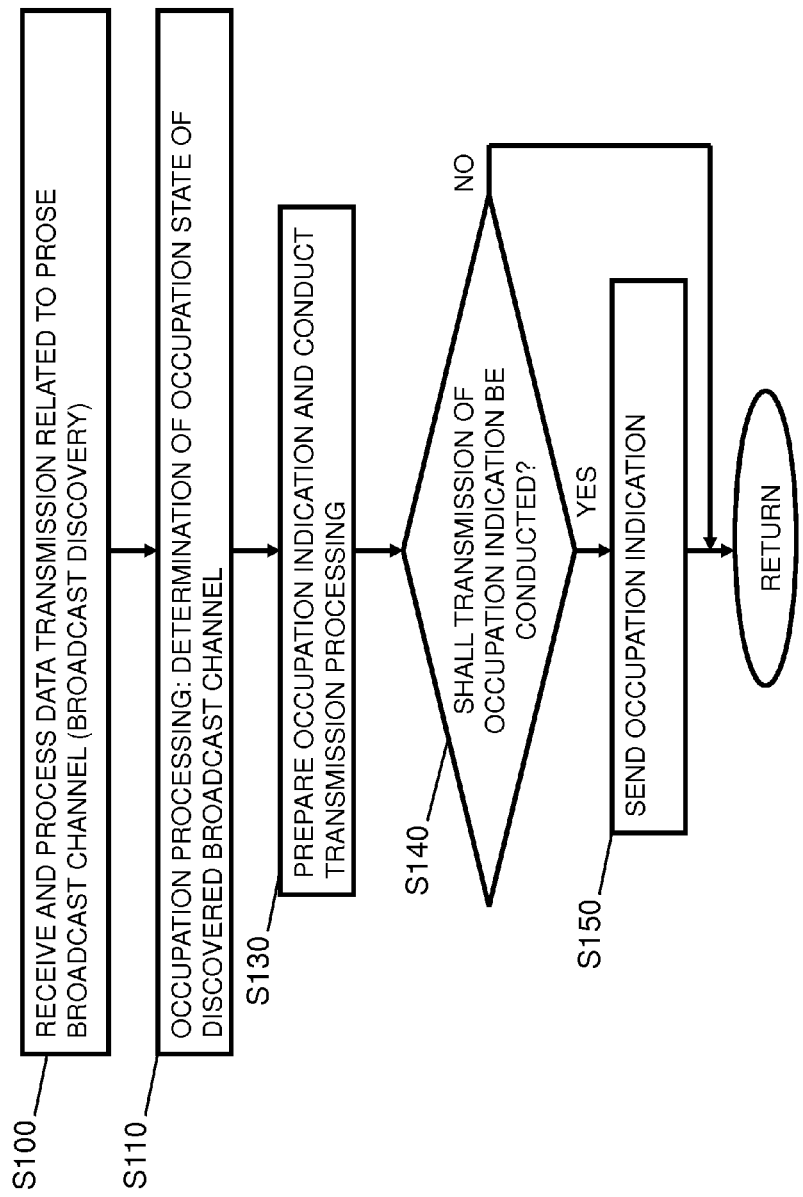
FIG. 4 shows a flow chart of an example of processing conducted in a communication element acting as an occupation indication provider in a broadcast channel management procedure.

FIG. 4 shows a flow chart of an exemplifying processing conducted in a communication element acting as an occupation indication provider (such as UE1 10 in FIG. 1) in a broadcast channel management procedure according to some embodiments.

In S100, a data transmission related to a communication channel allocated to a D2D broadcast communication is received and processed. For example, the data transmission may be a beacon signaling related to a broadcast channel discovery, a broadcast communication including a broadcast discovery message or sequence, or the like.

Then, in this example, an occupation processing is started. In S110, an occupation state is determined which is related to the received data transmission. For example, the occupation state may be determined by detecting that a D2D broadcast communication is conducted or intended to be conducted by a broadcasting communication element, such as an UE (e.g. UE2 30 uses the channel allocated for broadcasting communication or it sends a discovery signal indicating that it intends to start a broadcasting communication). That is, the occupation state may reflect that a communication channel is assumed to be occupied for a D2D broadcast communication by any UE.

In this example, in S130, an occupation indication related to the determined occupation state is prepared.

According to some embodiments, the occupation indication related to the determined occupation state is prepared by generating a broadcast discovery sequence defined for the communication channel. It is to be noted that in this case, according to some embodiments, resources to be used for communicating the broadcast discovery sequence used as the occupation indication are to be different from resources to be used by a communication on the communication channel, i.e. the occupation indication transmission shall not interfere (not at least more than allowable) with the (already conducted) broadcast communication on the occupied channel.

According to some embodiments, the occupation indication may have different forms. For example, the data transmission related to the communication channel allocated to the D2D broadcast communication may comprise a primary broadcast discovery sequence defined for each communication channel and used for a broadcast channel discovery processing. Then, the occupation indication may be a secondary broadcast discovery sequence defined for each communication channel and linked to the primary broadcast discovery sequence. In this case, according to some embodiments, resources used for communicating the primary broadcast discovery sequence and resources used for communicating the secondary broadcast discovery sequence are not overlapping with each other (e.g. in a time domain).

According to some further embodiments, the occupation indication is prepared by generating a higher layer signaling comprising a channel occupation message. For example, the higher layer signaling is part of a D2D discovery/beaconing message including an information element comprising the occupation indication. The higher layer signaling may be used, in cases where the occupation state is determined by collecting information regarding discovered broadcast channels on the basis of one or more received data transmission (e.g. from different sources) related to communication channels allocated to a D2D broadcast communication, wherein on the basis of the collected information it is determined that a D2D broadcast communication is conducted or intended to be conducted by a UE on at least one of the communication channels to which each received data transmission is related. In this case, the occupation state reflects that a communication channel (or plural communication channels) is (are) occupied for a D2D broadcast communication.

In this example, when the occupation indication is prepared, in S140, a processing for transmitting the occupation indication is started. For example, it is determined whether the occupation indication prepared in S130 is to be transmitted or not.

For example, the processing for transmitting the occupation indication comprises a decision of whether a transmission of the occupation indication is to be caused. In case the occupation indication is in the form of the secondary broadcast discovery sequence, the decision may be based on at least one of the following: a received power of the data transmission related to the communication channel allocated to the D2D broadcast communication (i.e. the data transmission providing the primary broadcast discovery sequence), a received power of an occupation indication received from another communication network (i.e. when an occupation indication such as a secondary broadcast discovery sequence is received which is sent from another UE), and an external command indicating that the occupation indication is to be transmitted (e.g. in case the eNB 20 controls a selection which UE is allowed to send the occupation indication).

Otherwise, in case the occupation indication is in the form of the higher layer signaling, the decision may be based on at least one of the following: a number of occupied communication channels determined in the determination of the occupation state (for example, the receiving UE having detected the highest number of occupied channels), a received power of a beacon signal received from another UE (related to a determination of UEs being in a predefined adjacent area), a number of occupied communication channels indicated in an occupation indication received from another UE (i.e. when another UE reports already a higher number of occupied channels, this report has to be given a higher priority than the own report resulting in an inhibition or stopping of a transmission of the own report), and an external command indicating that the occupation indication is to be transmitted (e.g. in case the eNB 20 controls a selection which UE is allowed to send the occupation indication).

In case the determination is negative (NO in S140), i.e. the transmission is not to be conducted (or an already conducted transmission is to be stopped), the processing returns (including a possible stop of a current transmission).

Otherwise, in case the determination is positive (YES in S120), i.e. the occupation indication is to be transmitted, the processing proceeds to S150. In S150, the occupation indication is transmitted by suitable means, i.e. by using suitable resources. For example, the occupation indication is transmitted via a broadcasting communication to the broadcasting UE (e.g. UE3 40).

FIG. 11 shows a flow chart of an exemplifying processing conducted in a communication element (e.g. UE3 40) acting as an occupation indication receiver in a channel management procedure according to some embodiments.

In S2100, an occupation indication is received and processed. The occupation indication indicates that a communication channel is occupied by a D2D communication.

According to some examples, the occupation indication is a discovery sequence defined for the communication channel. According to some further examples, the occupation indication is a higher layer signaling comprising a channel occupation message.

In this example, in S2200, a communication channel to be used for a D2D communication is set on the basis of the processing result of the occupation indication. The communication channel to be used for a D2D communication is set to a different communication channel, i.e. a channel for which no occupation indication is detected in the occupation indication.

Figure 5:
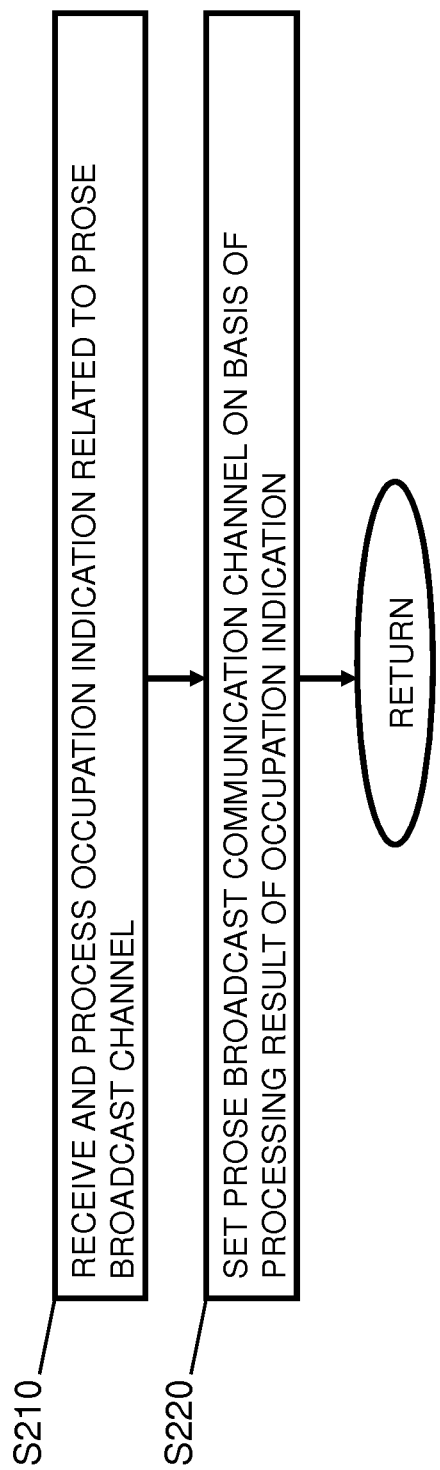
FIG. 5 shows a flow chart of an example of processing conducted in a communication element acting as an occupation indication receiver in a broadcast channel management procedure.

FIG. 5 shows a flow chart of an exemplifying processing conducted in a communication element (e.g. UE3 40) acting as an occupation indication receiver in a broadcast channel management procedure according to some embodiments.

In S210, an occupation indication is received and processed. The occupation indication indicates that a communication channel is occupied by a D2D broadcast communication, According to some embodiments, the occupation indication is a broadcast discovery sequence defined for the communication channel. In this case, according to some embodiments, resources used for communicating the broadcast discovery sequence are different from resources to be used by a communication on the communication channel.

According to some embodiments, the occupation indication may have different forms. For example, in case a primary broadcast discovery sequence is defined for each communication channel and used for a broadcast channel discovery processing, the occupation indication may be a secondary broadcast discovery sequence defined for each communication channel and linked to a corresponding primary broadcast discovery sequence. According to some embodiments, resources used for communicating the primary broadcast discovery sequence and the secondary broadcast discovery sequence are not overlapping with each other e.g. in the time domain.

According to some embodiments, the occupation indication is a higher layer signaling comprising a channel occupation message. The higher layer signaling may be part of a D2D discovery/beaconing message including an information element comprising the occupation indication. The occupation indication may comprise information in the form of a channel occupation message indicating communication channels where a D2D broadcast communication is conducted or intended to be conducted by another broadcasting communication element, such as another UE.

In this example, in S220, a communication channel to be used for a D2D broadcast communication is set on the basis of the processing result of the occupation indication. For example, it is detected whether at least one of a primary broadcast discovery sequence (from another broadcasting UE) and a secondary broadcast discovery sequence is received which are related to a broadcast channel. Then, the communication channel to be used for a D2D broadcast communication is set to a different communication channel, i.e. a channel for which neither a primary broadcast discovery sequence nor a secondary broadcast discovery sequence is received, i.e. a channel which is assumed to be unoccupied, according the occupation indication.

Figure 6:
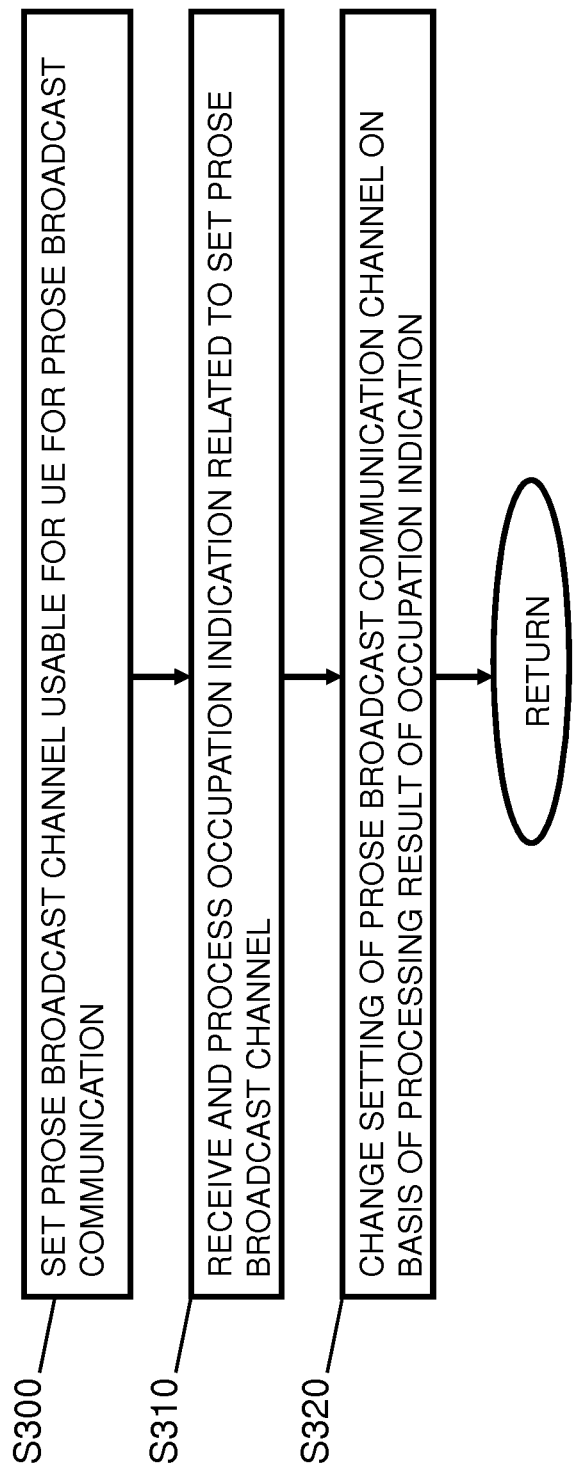
FIG. 6 shows a flow chart of an example of processing conducted in a communication element acting as an occupation indication receiver in a broadcast channel management procedure.

FIG. 6 shows a flow chart of an exemplifying processing conducted in a communication element (e.g. UE3 40) acting as an occupation indication receiver in a broadcast channel management procedure according to some further embodiments being based on the processing described in connection with FIG. 5. Specifically, in the case depicted in FIG. 6, it is assumed that the communication element (UE) receiving the occupation indication has already set a communication channel for broadcasting communication, or may already send a discovery signal or the like for this broadcasting channel. The example according to FIG. 6 may represent, for example, a case where the broadcasting UE is moving so that the communication conditions are changing in a dynamic manner.

First, in S300, a communication channel to be used by the communication element for a D2D broadcast communication is set. For example, the communication network control element allocates to a UE (such as UE3 40) a communication channel to be used for a D2D broadcast communication. Alternatively, in case of a non-centralized control scheme, the UE (such as UE3 40) may select a communication channel to be used for a D2D broadcast communication by itself.

Then, in S310, an occupation indication is received and processed. The occupation indication is typically used to indicate an occupation state at a UE (e.g. UE1 10) receiving a data transmission related to a broadcast communication wherein it may be determined whether a communication channel is occupied by a D2D broadcast communication.

According to some embodiments, the occupation indication is a broadcast discovery sequence defined for the communication channel. In this case, according to some embodiments, resources used for communicating the broadcast discovery sequence are different from resources to be used by a communication on the communication channel.

According to some embodiments, the occupation indication may have different forms. For example, in case there is defined a primary broadcast discovery sequence for each communication channel and used for a broadcast channel discovery processing, the occupation indication may be a secondary broadcast discovery sequence defined for each communication channel and linked to a corresponding primary broadcast discovery sequence. According to some embodiments, resources used for communicating the primary broadcast discovery sequence and the secondary broadcast discovery sequence are not overlapping with each other e.g. in the time domain.

According to some embodiments, the occupation indication is a higher layer signaling comprising a channel occupation message. For example, the higher layer signaling is part of a D2D discovery/beaconing message including an information element comprising the occupation indication. The occupation indication includes, for example, information in the form of a channel occupation message indicating communication channels where a D2D broadcast communication is conducted or intended to be conducted by another broadcasting communication element, such as another UE.

In this example, in S320, in case the processing of the occupation indication indicates that the broadcast channel set or allocated in S300 is occupied by a broadcasting communication of another UE, the previous setting or allocation of the communication channel to be used for the D2D broadcast communication is changed on the basis of the processing result of the occupation indication. For example, it is detected whether a primary broadcast discovery sequence and/or a secondary broadcast discovery sequence is received, wherein, as the communication channel to be used for a D2D broadcast communication of a UE (e.g. UE3 40), a communication channel is set or allocated for which neither a primary broadcast discovery sequence nor a secondary broadcast discovery sequence is received.

Figure 7:
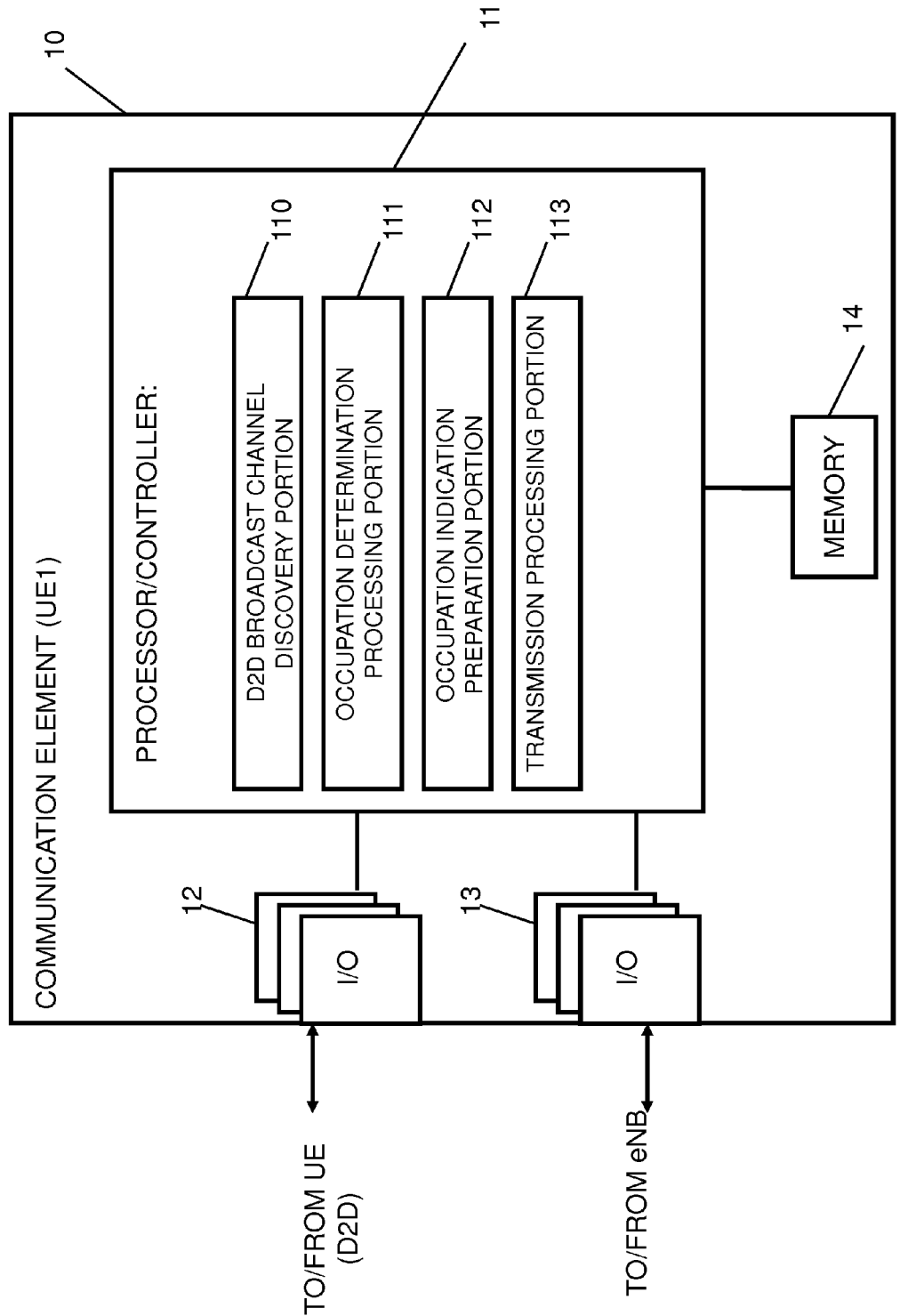
FIG. 7 shows a diagram of an example of a communication element acting as an occupation indication provider in a broadcast channel management procedure.

In FIG. 7, an exemplifying diagram illustrating a configuration of a communication element suitable to act as an occupation indication provider in a broadcast channel management procedure according to some embodiments is shown, which is configured to implement the broadcast channel management control procedure as described in connection with some of the embodiments. It is to be noted that the communication element like the UE1 10 shown in FIG. 7 may comprise other elements or functions besides those described herein below. Even though reference is made to a communication element or UE, the communication element may be also another device having a similar function, such as a chipset, a chip, a module etc., which may also be part of a UE or attached as a separate element to a UE, or the like. It should be understood that each block and any combination thereof may be implemented by various means or their combinations, such as hardware, software, firmware, one or more processors and/or circuitry.

The communication element shown in FIG. 7 may comprise a processing function, control unit or processor 11, such as a CPU or the like, which is suitable for executing instructions given by programs or the like related to the mobility management control procedure. The processor 11 may comprise one or more processing portions dedicated to specific processing as described below, or the processing may be run in a single processor. Portions for executing such specific processing may be also provided as discrete elements or within one or more processors or processing portions, such as in one physical processor like a CPU or in several physical entities, for example. Reference signs 12 and 13 denote transceiver or input/output (I/O) units (interfaces) connected to the processor 11. The I/O units 12 may be used for communicating with one or more communication elements like UEs e.g. in a D2D communication. The I/O units 13 may be used for communicating with a communication network control element, e.g. with eNB 20. The I/O units 12 and 13 may be a combined unit comprising communication equipment towards several network elements, or may comprise a distributed structure with a plurality of different interfaces for different network elements. Reference sign 14 denotes a memory usable, for example, for storing data and programs to be executed by the processor 11 and/or as a working storage of the processor 11.

The processor 11 may be configured to execute processing related to the above described broadcast channel management procedure. The processor 11 may comprise a sub-portion 110 as a processing portion which is usable for conducting a D2D (or ProSe) broadcast channel discovery procedure. The portion 110 may be configured to perform processing according to S100 of FIG. 4., the processor 11 may comprise a sub-portion 111 usable as a portion for determining an occupation state of broadcast channels. The portion 111 may be configured to perform processing according to S110 of FIG. 4., The processor 11 may comprise a sub-portion 112 usable as a portion for preparing the occupation indication. The portion 112 may be configured to perform a processing according to S130 of FIG. 4. In addition, the processor 21 may comprise a sub-portion 113 usable as a portion for conducting a transmission processing. The portion 113 may be configured to perform a processing according to S140 and S150 of FIG. 4.

Figure 8:
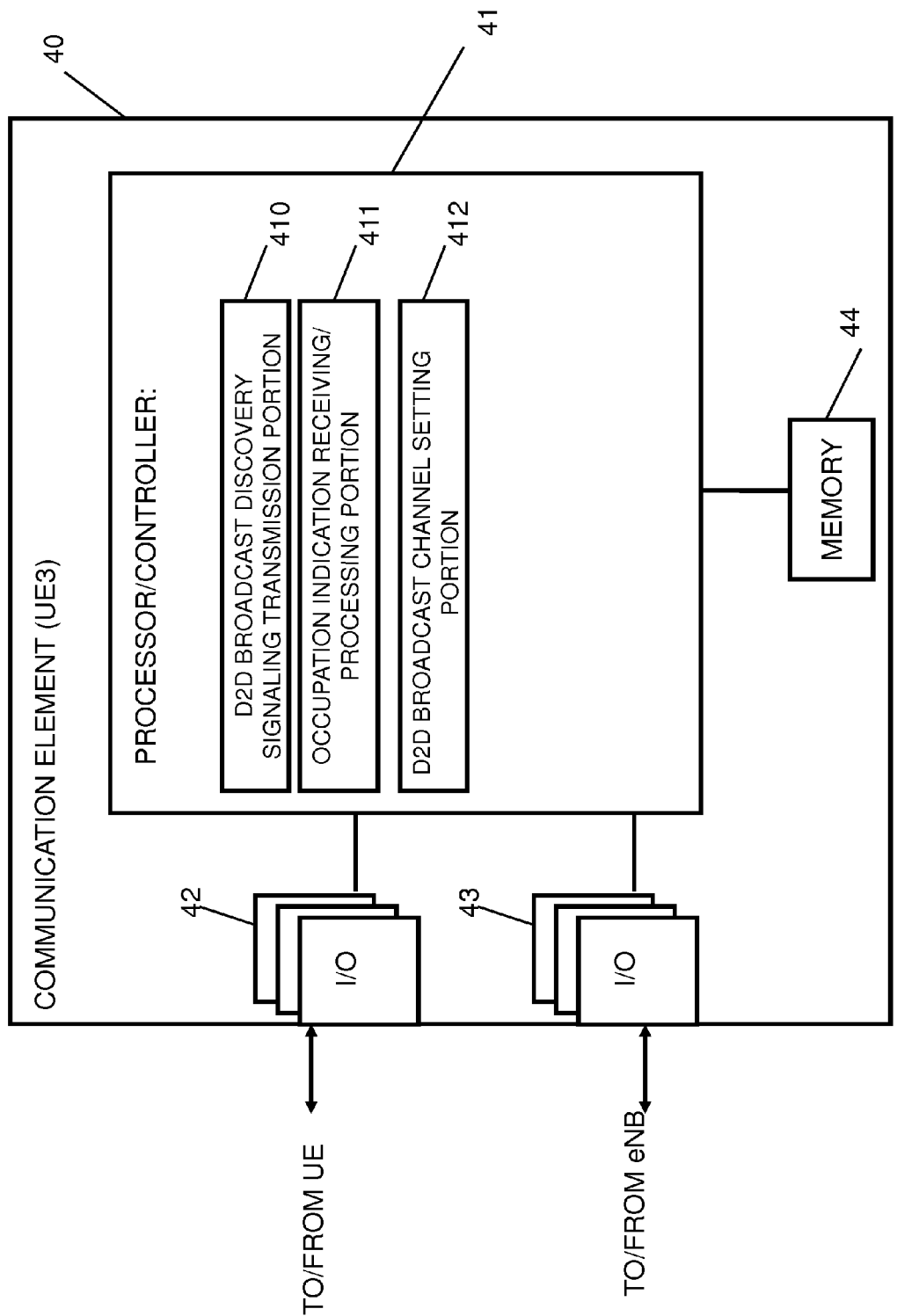
FIG. 8 shows a diagram of an example of a communication element acting as an occupation indication receiver in a broadcast channel management procedure.

In FIG. 8, an exemplifying diagram illustrating a configuration of a communication element suitable to act as an occupation indication receiver in a broadcast channel management procedure according to some embodiments is shown, which is configured to implement the broadcast channel management control procedure as described in connection with some of the embodiments. It is to be noted that the communication element like the UE3 40 shown in FIG. 8 may comprise other elements or functions besides those described herein below. Even though reference is made to a communication element or UE, the communication element may be also another device having a similar function, such as a chipset, a chip, a module etc., which may also be part of a UE or attached as a separate element to a UE, or the like. It should be understood that each block and any combination thereof may be implemented by various means or their combinations, such as hardware, software, firmware, one or more processors and/or circuitry.

The communication element shown in FIG. 8 may comprise a processing function, control unit or processor 41, such as a CPU or the like, which is suitable for executing instructions given by programs or the like related to the mobility management control procedure. The processor 41 may comprise one or more processing portions dedicated to specific processing as described below, or the processing may be run in a single processor.

Portions for executing such specific processing may be also provided as discrete elements or within one or more processors or processing portions, such as in one physical processor like a CPU or in several physical entities, for example. Reference signs 42 and 43 denote transceiver or input/output (I/O) units (interfaces) connected to the processor 41. The I/O units 42 may be used for communicating with one or more communication elements like UEs e.g. in a D2D communication. The I/O units 43 may be used for communicating with a communication network control element, e.g. with eNB 20. The I/O units 42 and 43 may be a combined unit comprising communication equipment towards several network elements, or may comprise a distributed structure with a plurality of different interfaces for different network elements. Reference sign 44 denotes a memory usable, for example, for storing data and programs to be executed by the processor 41 and/or as a working storage of the processor 41.

The processor 41 may be configured to execute processing related to the above described broadcast channel management procedure. The processor 41 may comprise a sub-portion 410 as a processing portion which is usable for conducting a D2D (or ProSe) broadcast channel discovery procedure (e.g. for sending a discovery signal or sequence for a set broadcast channel). The processor 41 may comprise a sub-portion 411 usable as a portion for receiving and processing an occupation indication. The portion 411 may be configured to perform processing according to S210 of FIG. 5 or S310 according to FIG. 6., The processor 41 may comprise a sub-portion 412 usable as a portion for setting a channel for D2D broadcast communication. The portion 412 may be configured to perform a processing according to S220 of FIG. 5 or S320 of FIG. 6.

Figure 9:
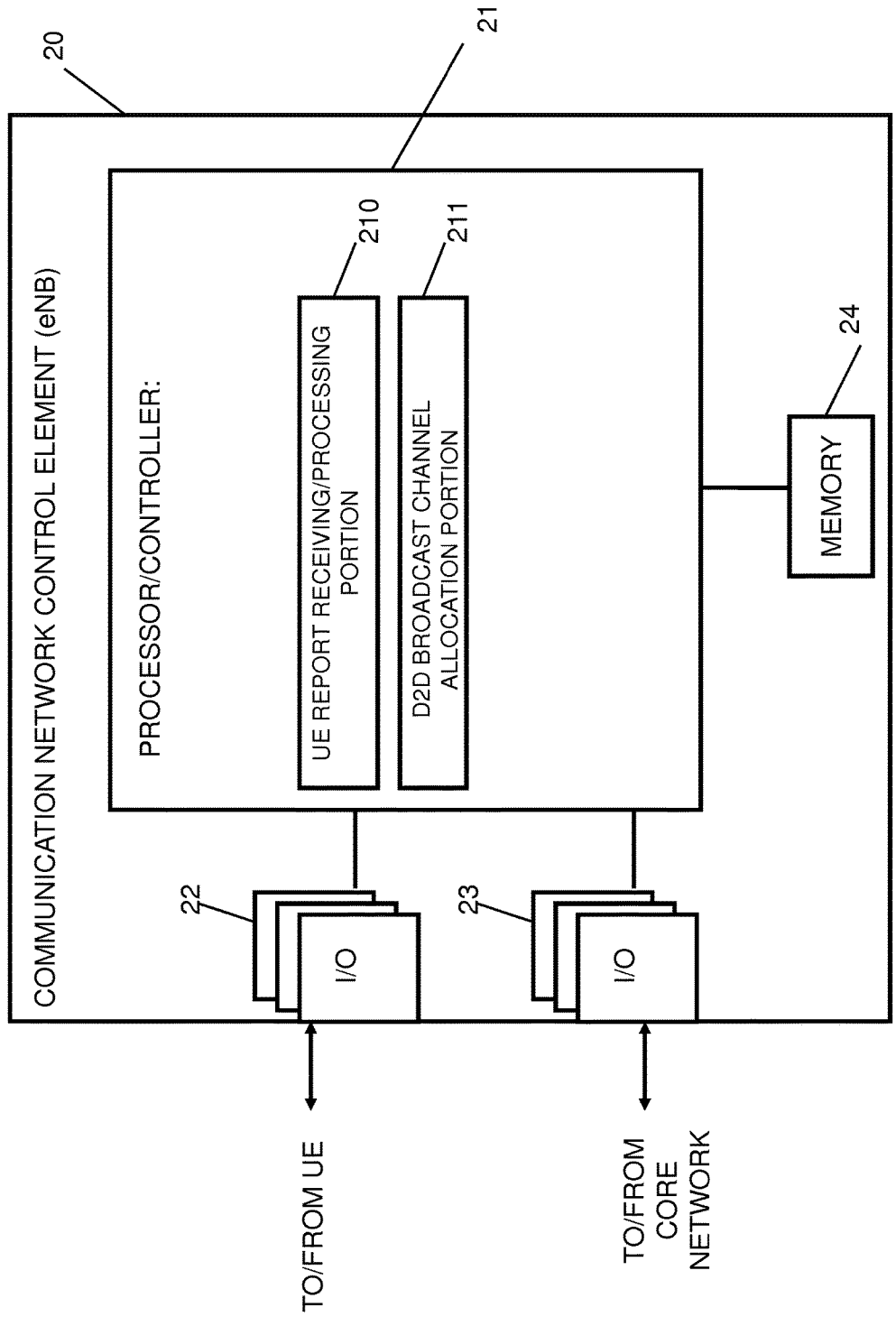
FIG. 9 shows a diagram of an example of a communication network control element in a broadcast channel management procedure.

In FIG. 9, a diagram illustrating an exemplifying configuration of a communication network control element of a communication cell according to some embodiments is shown, which is configured to implement the broadcast channel management procedure as described in connection with some of the embodiments. The communication network control element may be used in case of a centralized control scheme where the broadcast channel is allocated by the eNB 20 to a controlled UE. It is to be noted that the communication network control element like the eNB 20 shown in FIG. 9 may comprise other elements or functions besides those described herein below. Even though reference is made to a base station or eNB, the communication network control element may be also another device having a similar function, such as a chipset, a chip, a module etc., which may also be part of a base station or attached as a separate element to a base station, or the like. It should be understood that each block and any combination thereof may be implemented by various means or their combinations, such as hardware, software, firmware, one or more processors and/or circuitry.

The communication network control element shown in FIG. 9 may comprise a processing function, control unit or processor 21, such as a CPU or the like, which is suitable for executing instructions given by programs or the like related to the mobility management control procedure. The processor 21 may comprise one or more processing portions dedicated to specific processing as described below, or the processing may be run in a single processor. Portions for executing such specific processing may be also provided as discrete elements or within one or more processors or processing portions, such as in one physical processor like a CPU or in several physical entities, for example. Reference signs 22 and 23 denote transceiver or input/output (I/O) units (interfaces) connected to the processor 21. The I/O units 22 may be used for communicating with one or more communication elements like UEs. The I/O units 23 may be used for communicating with a core network or the like. The I/O units 22 and 23 may be a combined unit comprising communication equipment towards several network elements, or may comprise a distributed structure with a plurality of different interfaces for different network elements. Reference sign 24 denotes a memory usable, for example, for storing data and programs to be executed by the processor 21 and/or as a working storage of the processor 21.

The processor 21 may be configured to execute processing related to the above described broadcast channel management procedure. The processor 21 may comprise a sub-portion 210 usable as a portion for receiving and processing an UE report based on a processing of occupation indication(s) received at the UE side. The portion 210 may be configured to perform processing related to S85 and S90 of FIG. 3 (in case of a centralized control option). The processor 21 may comprise a sub-portion 211 usable as a portion for allocating (or changing) a broadcast channel to be used by a controlled UE for D2D broadcast communication. The portion 211 may be configured to perform a processing according to S90 of FIG. 3.

According to some examples, there is provided an apparatus comprising at least one processor, and at least one memory for storing instructions to be executed by the processor, wherein the at least one memory and the instructions are configured to, with the at least one processor, cause the apparatus at least: to receive and process a communication element report indicating an occupation state of at least one communication channel by a device-to-device communication, and to allocate, to a controlled communication element, a communication channel to be used for a device-to-device communication, on the basis of the processing result of the report. For example, the apparatus may be implemented in a communication network control element (such as an eNB) controlling resources for a D2D communication by a UE controlled by the communication network control element.

According to another embodiment, there is provided an apparatus comprising means (11, 110) for receiving and processing a data transmission related to a communication channel allocated to a device-to-device communication, means (11, 111) for determining an occupation state related to the received data transmission, means (11, 112) for preparing an occupation indication related to the determined occupation state, and means (11, 113) for conducting a processing for transmitting the occupation indication.

According to still another embodiment, there is provided an apparatus comprising means (41, 411) for receiving and processing an occupation indication indicating that a communication channel is occupied for a device-to-device communication, and means (41, 412) for setting a communication channel to be used for a device-to-device communication on the basis of the processing result of the occupation indication.

It should be appreciated that an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; Additionally, embodiments may also apply wired technologies, e.g. IP based access technologies like cable networks or fixed lines.

a user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards the base station or eNB. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network, or a nearly exclusive downlink only device, such as a portable video player. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor are software code independent and may be specified using any known or future developed programming language, such as a high-level programming language, such as objective-C, C, C++, C#, Java, etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units or means or in a distributed fashion, for example, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module comprising such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, comprising a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications maybe made thereto.

For example, while in the above described examples and embodiments cases are explained where the physical sequence based option as illustrated in FIG. 2, for example, or the channel occupation message based option as illustrated in FIG. 3, for example, is used, it is also possible that at least some of the elements involved in the broadcast channel management procedure are configured to conduct a control procedure according to both options in varying combinations, for example in parallel.

A communication element such as a UE may comprise elements of both a broadcasting UE and an occupation indication providing UE (broadcasting receiving UE), i.e. elements as indicated e.g. in FIGS. 7 and 8 may be included one UE.

In addition, according to some embodiments, the data transmission related to the communication channel used for D2D broadcast communication is not limited to a broadcast channel discovery signaling. For example, in case of a public safety application, a broadcasting communication may be used as the data transmission being processed in the selected receiving UEs.

According to some embodiments, the occupation indication supports a UE to reuse the broadcast channels with spatial reuse within one eNB cell. If it is centralized broadcast channel management controlled by eNB, the broadcast channel allocation will be based on the report of detected occupation indication by UE. Then, the eNB allocates channels based on the report.

Furthermore, it is to be noted that the definition that a data transmission is received, for example, is to be understood in various manners. For example, "receiving a data transmission" is related to a process of obtaining such data on a recipient side (which may be, for example, a corresponding means, a processor, one or more processing portions etc.) by means of any suitable provision method, such as a signaling from another node, another processing portion or processor, a memory etc. The signaling may be executed by a wired connection, a wireless connection or a combination thereof.

The invention claimed is:

1. An apparatus comprising:
at least one processor, and
at least one memory for storing instructions to be executed by the processor, wherein the at least one memory and the instructions are configured to, with the at least one processor, cause the apparatus at least to:
receive and process, by a first user device, a primary discovery sequence transmission from a second user device on a broadcast channel allocated to a device-to-device communication, determine the broadcast channel as occupied,
prepare an occupation indication based on the determination, and
conduct a processing for transmitting the occupation indication to at least one of a third user device and a communication network control element, wherein the third user device is not capable of detecting the second user device,
for choosing a broadcast channel in the device-to-device communication which is different from that indicated in the occupation indication, wherein in a case the third user device receives the occupation indication, the broadcast channel is chosen from allocated broadcast channels.

2. The apparatus according to claim 1, wherein the at least one memory and the instructions are further configured to, with the at least one processor, cause the apparatus at least to prepare the occupation indication related to the determined occupation state by generating a secondary discovery sequence and wherein communication resources used for transmitting primary and secondary sequences are not overlapping with each other.

3. The apparatus according to claim 1, wherein the conducting the processing for transmitting the occupation indication further comprises a decision on whether a transmission of the occupation indication is to be caused, wherein the decision is based on at least one of:
a received power of the data transmission related to the communication channel allocated to the device-to-device broadcast communication,
a received power of an occupation indication received from another communication element, and
an external command indicating that the occupation indication is to be transmitted.

4. The apparatus according to claim 1, wherein the preparing the occupation indication further comprises causing the apparatus to generate a higher layer signaling comprising a channel occupation message.

5. The apparatus according to claim 1, wherein the preparing the occupation indication further comprises causing the apparatus to generate a higher layer signaling comprising a channel occupation message, wherein the higher layer signaling is part of a device-to-device discovery/beaconing message including an information element comprising the occupation indication.

6. The apparatus according to claim 1, wherein the preparing the occupation indication further comprises causing the apparatus to:
generate a higher layer signaling comprising a channel occupation message, and
determine the broadcast channel as occupied by collecting information regarding discovered broadcast channels with regard to device-to-device broadcast communication.

7. The apparatus according to claim 1, wherein the apparatus is comprised in a communication element capable of participating in a device-to-device communication, wherein the communication element is a terminal device or user equipment capable of communicating in a communication cell controlled by a communication network control element.

8. A method comprising:
receiving and processing a primary discovery sequence transmission from a second user device on a broadcast channel allocated to a device-to-device communication,
determining the broadcast channel as occupied,
preparing an occupation indication based on the determination, and conducting a processing for transmitting the occupation indication to at least one of a third user device and a communication network control element, wherein the third user device is not capable of detecting the second user device,
for choosing a broadcast channel in the device-to-device communication which is different from that indicated in the occupation indication, wherein in a case the third user device receives the occupation indication, the broadcast channel is chosen from allocated broadcast channels.

9. The method according to claim 8, further comprising preparing the occupation indication related to the determined occupation state by generating a secondary discovery sequence and wherein communication resources used for transmitting primary and secondary sequences are not overlapping with each other.

10. The method according to claim 8, wherein the conducting the processing for transmitting the occupation indication further comprises a decision on whether a transmission of the occupation indication is to be caused, wherein the decision is based on at least one of:

a received power of the data transmission related to the communication channel allocated to the device-to-device broadcast communication, a received power of an occupation indication received from another communication network, and an external command indicating that the occupation indication is to be transmitted.

11. The method according to claim 8, wherein preparing the occupation indication further comprises generating a higher layer signaling comprising a channel occupation message.

12. The method according to claim 8, wherein preparing the occupation indication further comprises generating a higher layer signaling comprising a channel occupation message, wherein the higher layer signaling is part of a device-to-device discovery/beaconing message including an information element comprising the occupation indication.

13. The method according to claim 8, wherein preparing the occupation indication further comprises generating a higher layer signaling comprising a channel occupation message, and determining the broadcast channel as occupied by collecting information regarding discovered broadcast channels with regard to device-to-device broadcast communication.

14. An apparatus comprising:

at least one processor, and at least one memory for storing instructions to be executed by the processor, wherein the at least one memory and the instructions are configured to, with the at least one processor, cause the apparatus at least to:

receive and process, by a first user device or a communication network control element, an occupation indication from a second user device indicating that a broadcast channel allocated to a device-to-device communication is occupied, and choose at least one broadcast channel for the device-to-device communication which is different from that indicated in the occupation indication, wherein in a case the first user device receives the occupation indication, the broadcast channel is chosen from allocated broadcast channels.

15. The apparatus according to claim 14, wherein the occupation indication is a broadcast discovery sequence defined for the broadcast channel and wherein resources used for communicating the broadcast discovery sequence are different from resources to be used for other communication with regard to the device-to-device communication.

16. The apparatus according to claim 14, the apparatus being further caused to:

receive and process, as the occupation indication, a higher layer signaling comprising a channel occupation message.

17. The apparatus according to claim 14, the apparatus being further caused to:

receive and process, as the occupation indication, a higher layer signaling comprising a channel occupation message, wherein the higher layer signaling is part of a device-to-device discovery/beaconing message including an information element comprising the occupation indication.

18. The apparatus according to claim 14, the apparatus being further caused to:

receive and process, as the occupation indication, a higher layer signaling comprising a channel occupation message, wherein the occupation indication includes a channel occupation message indicating communication channels where a device-to-device communication is conducted or intended to be conducted by another communication element.

* * * * *